United States Patent [19]
Baloche et al.

[11] Patent Number: 5,755,491
[45] Date of Patent: May 26, 1998

[54] HINGE MECHANISM FOR A VEHICLE SEAT, AND A SEAT INCLUDING SUCH A MECHANISM

[75] Inventors: François Baloche, Flers; Yann Reubeuze, Landigou, both of France

[73] Assignee: Bertrand Faure Equipements SA, Boulogne, France

[21] Appl. No.: 785,631

[22] Filed: Jan. 17, 1997

[30] Foreign Application Priority Data

Jan. 22, 1996 [FR] France ................................. 96 00659

[51] Int. Cl.⁶ .................................................. G60N 2/02
[52] U.S. Cl. ....................................... 297/362; 297/367
[58] Field of Search ............................... 297/362, 367, 297/369

[56] References Cited

U.S. PATENT DOCUMENTS

| | | | |
|---|---|---|---|
| 4,076,309 | 2/1978 | Chekirda et al. | 297/367 X |
| 4,143,905 | 3/1979 | Hensel et al. | 297/362 X |
| 4,348,050 | 9/1982 | Letournoux et al. | 297/367 X |
| 4,629,251 | 12/1986 | Tezuka | 297/362 |
| 4,634,181 | 1/1987 | Pipon | 297/362 |
| 4,668,013 | 5/1987 | Wahlmann | 297/362 |
| 4,773,704 | 9/1988 | Engels | 297/362 |
| 4,887,863 | 12/1989 | Caillol | 297/362 |
| 4,930,841 | 6/1990 | Wittig | 297/362 X |
| 5,154,475 | 10/1992 | Kafitz | 297/362 |
| 5,209,637 | 5/1993 | Reubeuze | 297/362 X |
| 5,277,672 | 1/1994 | Droulon et al. | 297/362 X |
| 5,452,938 | 9/1995 | Ernst | 297/362 |
| 5,536,217 | 7/1996 | Droulon et al. | 297/362 X |

FOREIGN PATENT DOCUMENTS 2 241 884   9/1991   United Kingdom.

*Primary Examiner*—Jose V. Chen
*Assistant Examiner*—Rodney B. White
*Attorney, Agent, or Firm*—Larson & Taylor

[57] ABSTRACT

A hinge mechanism for a vehicle seat comprises first and second cheek plates connected to each other via a hypocycloid gear driven by a first control shaft, and further comprising a third cheek plate which guides toothed slugs that are normally maintained in engagement with a set of teeth of the second cheek plate by a resiliently biased cam. In this way, the second and third cheek plates are normally secured to each other; however, by actuating a second control shaft secured to the cam, the slugs can be released, thereby enabling the third cheek plate to rotate freely relative to the second cheek plate, thereby enabling the seat to be adjusted quickly.

10 Claims, 2 Drawing Sheets

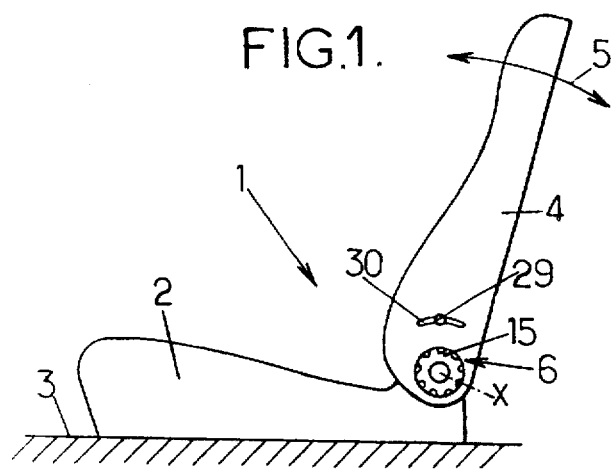
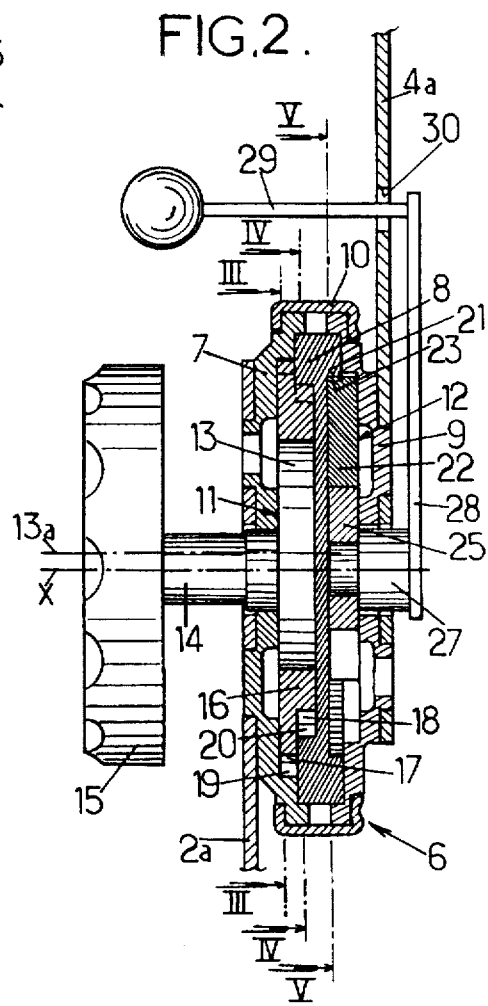
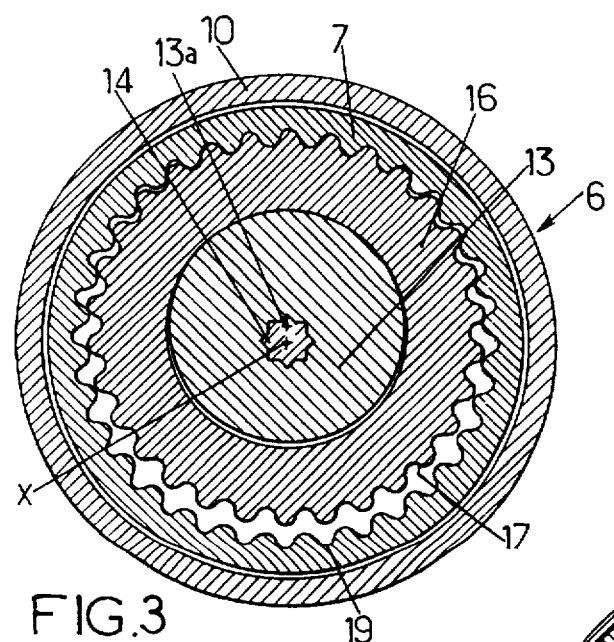
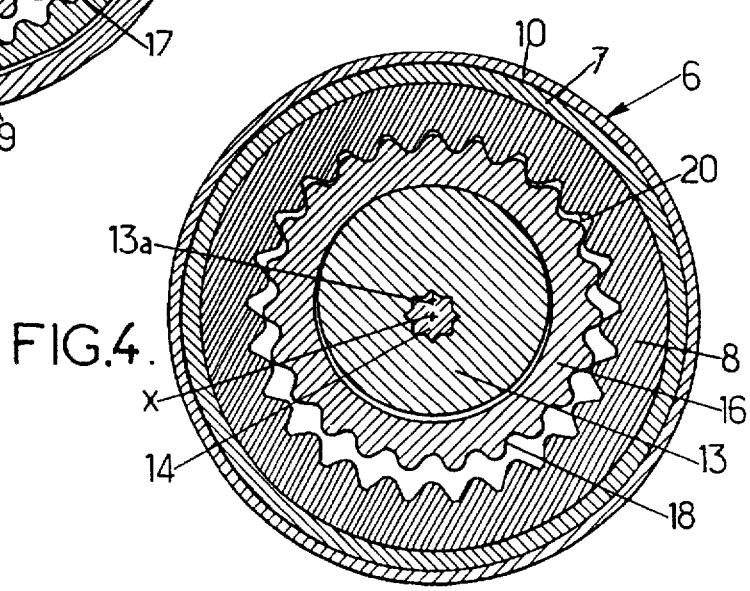

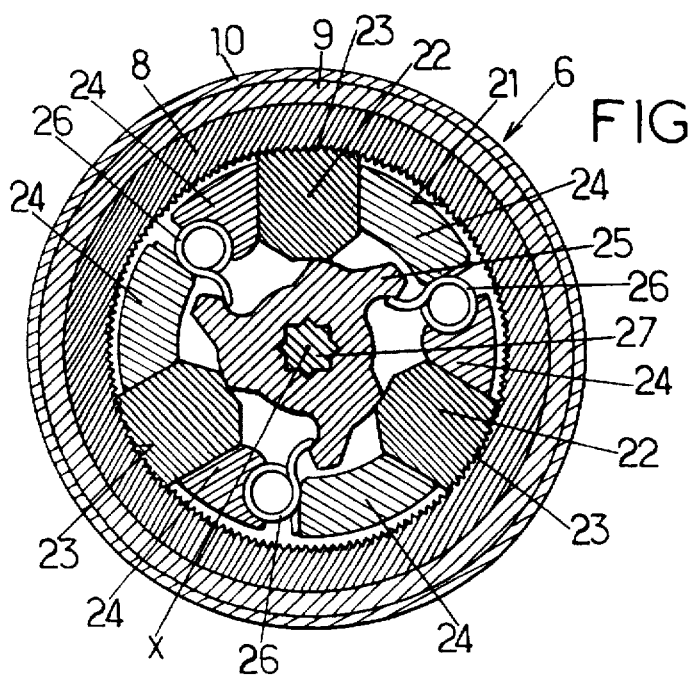
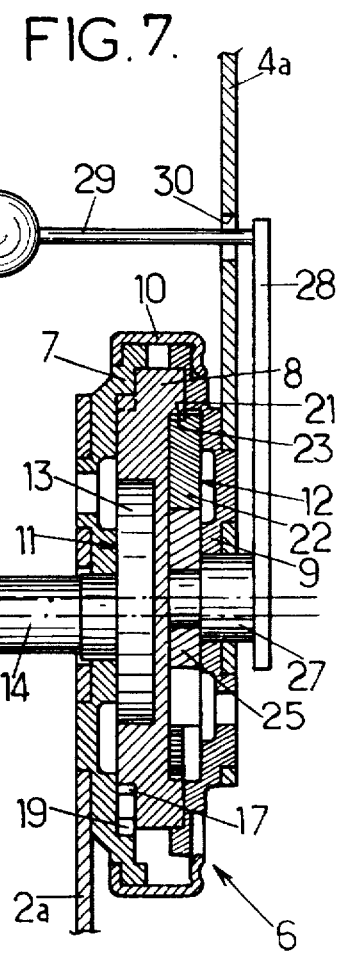
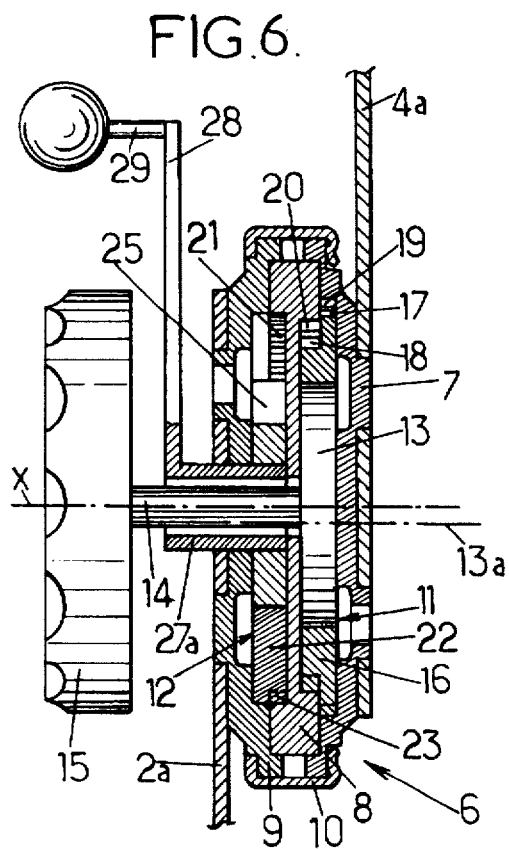

HINGE MECHANISM FOR A VEHICLE SEAT, AND A SEAT INCLUDING SUCH A MECHANISM

FIELD OF THE INVENTION

The present invention relates to hinge mechanisms for vehicle seats and to vehicle seats including such mechanisms, each mechanism presenting two portions that are mounted to pivot relative to each other.

The hinge mechanisms in question may be fitted in particular to the front seats of cars.

Of such hinge mechanisms, the invention relates more particularly to those which comprise:

- first and second cheek plates that are rotatable relative to each other;
- a hypocycloid gear having first and second circular sets of teeth that mesh with each other and that are respectively mechanically linked with the first and second cheek plates so that rotation between said first and second sets of teeth corresponds to corresponding rotation between said first and second cheek plates, the two sets of teeth having respective central axes that are parallel and offset relative to each other, referred to respectively as the first axis and the second axis;
- a first cam which is mounted to rotate about the first axis to drive relative rotation between the first and second sets of teeth; and
- a first control shaft for rotating the first cam.

BACKGROUND OF THE INVENTION

An example of such a hinge mechanism is given in particular in document EP-A-0 505 229.

Such a hinge mechanism makes it possible to obtain very precise adjustment of the seat, but allows the moving portion of the seat under its control to move only relatively slowly, and as a result quite a long time is required to move the moving portion through a large distance.

In addition, when the hinge mechanism is actuated by hand, it is tiring for the user to move the moving portion of the seat through such a large displacement.

OBJECTS AND SUMMARY OF THE INVENTION

A particular object of the present invention is to mitigate those drawbacks.

To this end, the invention provides a hinge mechanism of the kind in question which further comprises:

- a third cheek plate which is mounted to rotate relative to the second cheek plate about a third axis parallel to the above-mentioned first and second axes, the three cheek plates extending in parallel planes perpendicular to said axes, the second cheek plate being disposed between the first and third cheek plates, one of the second and third cheek plates being secured to a third set of teeth extending over at least an arc of a circle centered on the third axis and directed radially inwardly, and the first and third cheek plates being securable to the above-mentioned portions of the seat, respectively;
- at least one slug provided with an outwardly-directed set of teeth suitable for co-operating with the third set of teeth, said slug being guided to slide in a radial direction by at least one guide secured to that one of the second and third cheek plates which is not secured to the third set of teeth, and said slug being displaceable between an engaged position where it co-operates with the third set of teeth to prevent relative rotation between the second and third cheek plates, and a retracted position in which said slug does not co-operate with the third set of teeth;
- a second cam for controlling sliding of the slug, said second cam being urged by resilient means towards a rest position in which it places the slug in its engaged position; and
- a control member for moving the second cam from its rest position towards an actuated position in which it enables the slug to slide towards its retracted position.

By means of these dispositions, when the user of the seat seeks to move the moving portion of the seat under the control of the hinge mechanism through a large displacement, it suffices to actuate the control member for the second cam, thereby leaving the first and second cheek plates free to rotate relative to each other. The user can then adjust the seat by acting directly on the moving portion concerned.

In contrast, in order to obtain fine adjustment of the seat, the first control shaft is actuated, thereby giving rise to relative rotation between the first and second cheek plates by means of the hypocycloid gear.

In preferred embodiments of the hinge mechanism of the invention, use is also made of one or more of the following dispositions:

- one of the first and second sets of teeth is secured to the first cheek plate while the other is secured to the second cheek plate;
- the second set of teeth is secured to a ring gear also including a fourth circular set of teeth of diameter different from the diameter of the second set of teeth and engaging with a fifth circular set of teeth, one of the first and fifth sets of teeth being secured to the first cheek plate while the other is secured to the second cheek plate;
- the second cam is mounted to rotate about the third axis, and the control member of said second cam is a second control shaft extending longitudinally along the third axis;
- one of the first and second control shafts is hollow and receives the other of the first and second control shafts;
- the second control shaft is hollow and receives the first control shaft, the first shaft being secured to a control knob and the second shaft being secured to a handle extending radially outwards between the control knob and the cheek plates immediately beyond the periphery of the control knob;
- the first and second control shafts extend in opposite directions; and
- the third set of teeth is secured to the second cheek plate while the guide for the slug is secured to the third cheek plate.

The invention also provides a vehicle seat comprising two portions, in particular a seat proper and a seat back, which portions are mounted to pivot relative to each other by means of a hinge mechanism as defined above, one of said two portions being secured to the first cheek plate while the other of said two portions is secured to the third cheek plate.

BRIEF DESCRIPTION OF THE DRAWINGS

Other characteristics and advantages of the invention appear from the following description of various embodiments, given as non-limiting examples, and with reference to the accompanying drawings.

In the drawings:

FIG. 1 is a diagrammatic view of a seat fitted with a hinge mechanism of the invention;

FIG. 2 is an axial section view of a first embodiment of the hinge mechanism suitable for fitting to the seat of FIG. 1, said mechanism including a hypocycloid gear with a ring gear;

FIG. 3 is a section view on line III—III of FIG. 2;

FIG. 4 is a section view on line IV—IV of FIG. 2;

FIG. 5 is a section view on line V—V of FIG. 2;

FIG. 6 is an axial section view of a hinge mechanism similar to the mechanism shown in FIGS. 2 to 5, but including control means that are disposed differently; and FIG. 7 is an axial section view of a hinge mechanism in accordance with the second embodiment of the invention, and including a hypocycloid gear without a ring gear.

In the various figures, the same references designate elements that are identical or similar.

MORE DETAILED DESCRIPTION

FIG. 1 is a diagram of a motor vehicle front seat 1 having firstly a seat cushion mounted on the floor 3 of the vehicle, and secondly a seat back 4 which is mounted to pivot relative to the seat cushion 2 about a horizontal transverse axis X.

In this manner, the seat back 4 is displaceable forwards or backwards along the directions indicated by double-headed arrow 5, by means of a hinge mechanism 6, a first embodiment of which is shown in FIGS. 2 to 5.

The hinge mechanism 6 comprises:

- a first metal cheek plate 7 that is substantially circular, extending in a plane perpendicular to the axis X and, in the example shown, secured to the framework 2a of the seat cushion;
- a second metal cheek plate 8 that is likewise circular in shape and that extends parallel to the first cheek plate 7, said second plate 8 being mounted to rotate about the axis X;
- a third metal cheek plate 9 that is circular in shape and that extends parallel to the first two cheek plates, the second cheek plate 8 being sandwiched between the first cheek plate 7 and the third cheek plate 9, and the third cheek plate 9 being secured to the framework 4a of the seat back in the example shown;
- a metal band 10 having an inwardly open channel section profile surrounding the periphery of the first and third cheek plates 7, 9 so as to co-operate therewith to form a closed box;
- a hypocycloid gear 11 interposed between the first and second cheek plates; and
- a locking mechanism 12 interposed between the second and third cheek plates.

Firstly, in conventional manner, the hypocycloid gear 11 comprises the following:

- a circular metal first cam 13 extending in a plane perpendicular to the X axis and eccentric relative to said axis;
- a control shaft 14 extending longitudinally along the X axis through the first cheek plate 7 and secured to the first cam 13, said control shaft being actuated in the example described by manually rotating a control knob 15 fixed to the end thereof; and
- a ring gear 16 having two outside sets of teeth and mounted to rotate freely on the first cam 13, having both a first circular external set of teeth 17 centered on the axis 13a of the first cam, and a second external circular set of teeth 18 likewise centered on the axis 13a or the first cam, but smaller in diameter than the first set of teeth 17.

The first set of teeth 17 of the ring gear engages with an inwardly-directed circular set of teeth 19 on the first cheek plate 7, while the second set of teeth 18 of the ring gear engages with an inwardly-directed circular set of teeth 20 on the second cheek plate, both of said sets of teeth 19 and 20 being centered on the X axis.

Also, the locking mechanism 12 further comprises, likewise in conventional manner:

- an inwardly-directed circular set of teeth 21 belonging to the second cheek plate 8 and preferably centered on the X axis (or optionally centered on a third axis that is different from the X axis and from the axis 13a), said set of teeth 21 being formed on the side of the second cheek plate that faces the third cheek plate 9;
- three metal slugs 22, each having an outwardly-directed set of teeth 23 suitable for engaging in the inwardly-directed set of teeth 21 of the second cheek plate, said three slugs being guided in radial sliding by projections 24 belonging to the third cheek plate;
- a second cam 25 that is rotatable about the X axis, consisting in a cutout metal plate disposed in the same radial plane as the slugs 22, the second cam 25 being angularly displaceable between a cam rest position in which it urges the slugs towards an engaged position in which the outwardly-directed teeth 23 of the slugs co-operate with the inwardly-directed teeth 21 of the second cheek plate, and a cam actuated position in which the second cam enables the slugs 22 to reverse towards a retracted position in which their outwardly-directed sets of teeth no longer co-operate with the inwardly-directed teeth 21 of the second cheek plate;
- three metal springs 26 urging the second cam towards its rest position; and
- a control shaft 27 secured to the second cam 25 and extending longitudinally along the X axis through the third cheek plate 9.

In the example shown, the control shaft 27 is secured to a radial lever 28 whose free end is extended axially by a handle 29, which handle projects to the outside of the seat back 4 through a circularly arcuate slot 30 formed in the framework 4a of the seat back.

By means of the above dispositions, by turning the control knob 15 manually, it is possible to perform fine adjustment of the inclination of the seat back, while by actuating the handle 29, the seat back is allowed to pivot freely, thereby making it possible to achieve large angular displacement of said seat back quickly and easily.

In the variant shown in FIG. 6, the hinge mechanism 6 differs from the mechanism shown in FIGS. 2 and 5 solely in the following respects:

- the first cheek plate 7 is secured to the framework 4a of the seat back while the third cheek plate 9 is secured to the framework 2a of the seat proper, said third cheek plate being disposed towards the outside of the seat;
- the control shaft 27a of the second cam 25 is pierced by a central bore, and said control shaft extends towards the outside of the seat through the third cheek plate 9 and through the framework 2a of the seat proper;
- the control shaft 14 of the first cam 13 extends towards the outside of the seat through the central bore of the above-mentioned control shaft 27a, rather than through the first cheek plate 7; and the lever 28 extends radially outwards between the control knob 15 and the framework 2a of the seat cushion, immediately outside the periphery of the control knob 15.

In the second embodiment of the invention (FIG. 7), the hinge mechanism 6 differs from the hinge mechanism of FIGS. 2 to 5 in the following respects:

the hypocycloid gear 11 does not have a ring gear 16, the outwardly-directed teeth 17 being secured to the second cheek plate 8, which second cheek plate is mounted to rotate freely on the first cam 13; and the second and third cheek plates 8 and 9, the inwardly-directed set of teeth 21, the second cam 25, and the control shaft 27 are all centered on the axis 13a of the first cam, and no longer on the X axis.

In this latter embodiment, when the control knob 15 is rotated, the second and third cheek plats 8 and 9 are rotated with nutating motion about the X axis.

We claim:

1. A hinge mechanism for a vehicle seat comprising two portions mounted to pivot relative to each other, said mechanism comprising:

first and second cheek plates that are rotatable relative to each other;

a hypocycloid gear having first and second circular sets of teeth that mesh with each other and that are respectively mechanically linked with the first and second cheek plates so that rotation between said first and second sets of teeth corresponds to corresponding rotation between said first and second cheek plates, the two sets of parallel teeth having respective central first and second axes that are parallel and offset relative to each other, a first cam which is mounted to rotate about the first axis to drive relative rotation between the first and second sets of teeth;

a first control shaft for rotating the first cam;

a third cheek plate which is mounted to rotate relative to the second cheek plate about a third axis parallel to the first and second axes, the three cheek plates extending in parallel planes perpendicular to said first and second axes, the second cheek plate being disposed between the first and third cheek plates, one of the second and third cheek plates being secured to a third set of teeth extending over at least an arc of a circle centered on the third axis and directed radially inwardly, and the first and third cheek plates being securable to the portions of the seat respectively;

at least one slug provided with an outwardly-directed set of teeth suitable for co-operating with the third set of teeth, said slug being guided to slide in a radial direction by at least one guide secured to an other one of the second and third cheek plates which is not secured to the third set of teeth, and said slug being displaceable between an engaged position where said slug co-operates with the third set of teeth to prevent relative rotation between the second and third cheek plates, and a retracted position in which said slug does not co-operate with the third set of teeth;

a second cam for controlling sliding of the slug, said second cam being urged by resilient means towards a rest position in which said second cam places the slug in the engaged position; and a control member for moving the second cam from the rest position towards an actuated position in which said control member enables the slug to slide towards the retracted position.

2. A hinge mechanism according to claim 1, in which one of the first and second sets of teeth is secured to the first cheek plate while the other is secured to the second cheek plate.

3. A hinge mechanism according to claim 1, in which the second set of teeth is secured to a ring gear also including a fourth circular set of teeth of diameter different from the diameter of the second set of teeth and engaging with a fifth circular set of teeth, one of the first and fifth sets of teeth being secured to the first cheek plate while the other is secured to the second cheek plate.

4. A hinge mechanism according to claim 1, in which the second cam is mounted to rotate about the third axis, and the control member of said second cam is a second control shaft extending longitudinally along the third axis.

5. A hinge mechanism according to claim 4, in which one of the first and second control shafts is hollow and receives the other of the first and second control shafts.

6. A hinge mechanism according to claim 5, in which the second control shaft is hollow and receives the first control shaft, the first shaft being secured to a control knob and the second shaft being secured to a handle extending radially outwards between the control knob and the cheek plates immediately beyond the periphery of the control knob.

7. A hinge mechanism according to claim 4, in which the first and second control shafts extend in opposite directions.

8. A hinge mechanism according to claim 1, in which the third set of teeth is secured to the second cheek plate while the guide for the slug is secured to the third cheek plate.

9. A vehicle seat comprising two portions mounted to pivot relative to each other by means of a hinge mechanism according to claim 1, one of the two portions being secured to the first cheek plate while the other of the two portions is secured to the third cheek plate.

10. A vehicle seat according to claim 9, comprising a seat cushion and a seat back constituting the two portions of the seat that are mounted to pivot relative to each other by means of the hinge mechanism.

* * * * *